United States Patent
Zucker et al.

[11] Patent Number: 5,764,605
[45] Date of Patent: Jun. 9, 1998

[54] G FACTOR ALIGNMENT

[75] Inventors: Friedhelm Zucker; Christian Büchler, both of Villingen-Schwenningen, Germany

[73] Assignee: Deutsche Thomson-Brandt GmbH, Germany

[21] Appl. No.: 571,952

[22] PCT Filed: Jun. 30, 1994

[86] PCT No.: PCT/EP94/02146

§ 371 Date: Jun. 17, 1996

§ 102(e) Date: Jun. 17, 1996

[87] PCT Pub. No.: WO95/02244

PCT Pub. Date: Jan. 19, 1995

[30] Foreign Application Priority Data

Jul. 10, 1993 [DE] Germany ............... 43 23 067.9

[51] Int. Cl.⁶ ................................. G11B 7/09
[52] U.S. Cl. .................. 369/44.29; 369/44.35; 369/44.36
[58] Field of Search ............. 369/44.35, 44.36, 369/54, 44.13, 44.25, 44.29

[56] References Cited

U.S. PATENT DOCUMENTS

| | | | |
|---|---|---|---|
| 4,271,334 | 6/1981 | Yardy | 369/44.13 |
| 4,352,981 | 10/1982 | Sugiyama et al. | 369/44.13 |
| 4,397,010 | 8/1983 | Nabeshima | 369/44.13 |
| 4,807,207 | 2/1989 | Konno | 369/44.13 |
| 5,014,256 | 5/1991 | Horie et al. | 369/44.35 |
| 5,142,518 | 8/1992 | Hangai et al. | 369/44.35 |
| 5,146,443 | 9/1992 | Iwase et al. | 369/44.36 |
| 5,293,365 | 3/1994 | Rokutan | 369/44.36 |

FOREIGN PATENT DOCUMENTS

| | | |
|---|---|---|
| 0264837 | 4/1988 | European Pat. Off. . |
| 0274031 | 7/1988 | European Pat. Off. . |
| 0478314 | 4/1992 | European Pat. Off. . |
| 4029040 | 3/1991 | Germany . |
| 2-185723 | 7/1990 | Japan . |
| 90/08381 | 7/1990 | WIPO . |
| 91/08568 | 6/1991 | WIPO . |

OTHER PUBLICATIONS

Patent Abstracts of Japan, vol. 14, No. 465, and Japan Pat. No. 2-185723.

*Primary Examiner*—Thang V. Tran
*Attorney, Agent, or Firm*—Joseph S. Tripoli; Ronald H. Kurdyla; Alexander J. Burke

[57] ABSTRACT

A system for guidance of an optical scanning device is disclosed in which a gain factor (G factor) is responsive to a track error signal which is a function of the deflection of a scanning device. Deviation of the G factor setting from an optimum setting is automatically determined in conjunction with an open track control loop by driving a servo device (SV) to deflect an actuator from its neutral position and by evaluating a push-pull signal (PPTE). The G-factor is automatically set to an optimum value.

10 Claims, 5 Drawing Sheets

G FACTOR ALIGNMENT

The invention relates to methods and arrangements for G factor alignment or for setting a device, providing control signals or a track error signal in the case of deviations of the scanning beam from the information track of a recording substrate, in control loops for track guidance of optical scanning devices which for the purpose of track guidance of the scanning device make use, for example, of the known transverse push-pull or differential push-pull methods. Such scanning devices are fitted, for example, to CD players, videodisc players, draw disc players and magnetooptical recording and playback devices.

Push-pull refers in general to a method for generating a track error signal for the track control loop in the case of radial or lateral deviation of the scanning beam from the information track of the recording substrate, the push-pull signal being the differential signal of an at least bipartite photodetector which permits the scanning device or the scanning beam to be guided on the track of the recording substrate. The light reflected by the optical recording substrate and detected by the photodetector has an intensity distribution, which is a function of the nature of the incidence of the scanning beam on an information track or of the track positioning, is converted into electric signals and used as reference input variable or push-pull signal in the track control loop, which keeps the scanning beam on the information track. For this purpose, a track control amplifier or track controller controls a scanning device or a so-called pickup. The pickup contains a laser which generates the scanning beam, a movable holder, referred to as an actuator, of an objective lens for fine positioning and focusing of the scanning beam, which is controlled by a servo device, a beam splitter for splitting the transmitting and receiving directions of the light, and a photodetector for evaluating the light reflected by the recording substrate, cf. Electronic Components & Applications, Vol. 6, No. 4, 1984, pages 209 to 215. In order to be able to scan the relatively large track area of a recording substrate, the pickup is arranged as a rule on a coarse drive which can be moved perpendicularly to the information track and forms with the servo device the so-called radial drive for track guidance of the scanning device. The servo device, also referred to as the vernier drive, is provided in this case particularly in order to be able to follow rapid track displacements owing to disc runout or eccentricities of the recording substrate. Because of disc runout or eccentricity of the recording substrate, the objective lens is in perpetual movement via the pickup in order to follow the information track of the recording substrate. The optical axis of the scanning device, which is a function of the position of the objective lens varies its position and wanders over the photodetector, and the light reflected by the recording substrate reaches the photodetector as a function of the current position of the actuator. The result of this is that despite ideal positioning of the scanning beam on the information track of the recording substrate a track error signal or push-pull signal is generated owing to inclination and movement of the actuator and a deviation from the information track is simulated. Furthermore, the push-pull signal can simulate track deviations which originate from the mechanical stability or instability of the pickup and its adjustment. The photodetectors are fastened to the pickup by means of an adhesive, for example, and float in the adhesive as a function of temperature and air humidity, as a result of which movements are caused. It is therefore not possible to distinguish by means of the push-pull signal whether the track error signal is actually to be ascribed to a track deviation, an inclination of the actuator, instabilities in the pickup or else to properties of the recording substrate. The so-called transverse push-pull and the differential push-pull are already known for the purpose of avoiding this disadvantage, cf. WO 90 08 381 and Kiyoshi Ohsato, Differential push-pull method, Optical Memory Symposium, Japan, 18.2.1986. In the transverse push-pull or TPP, a single-beam scanning method, a photodetector is used which comprises four quadrants and which is assigned the actuator in such a way that in the case of track deviation the reflected light beam does not move parallel to a dividing line of the four-quadrant photodetector.

As a result, in the case of a deflection signal components are available in two mutually perpendicular directions, which render it possible to use a correction factor, the so-called G factor, to obtain a track error signal, also referred to as the track error, which is to be ascribed exclusively to track deviations or track errors. However, because of the numerous influencing factors which originate from the scanning device and also from the recording substrate, it can happen that a calculated value does not correspond to the conditions specifically present, with the result that the G factor must be set manually for each device. The problem of setting the G factor, or the G factor alignment also occurs in the case of the so-called differential push-pull. The differential push-pull or DPP is a three-beam method, that is to say in addition to a main beam positioned on the track two auxiliary beams provided between the tracks ahead of and behind the main beam are used for track guidance, and the spots provided by the beams wander in the same direction in the case of deflection of the actuator. The light, reflected by the recording substrate, of the main beam and of the auxiliary or secondary beams is respectively detected with a bipartite photodetector, and a push-pull signal is provided from each photodetector by means of a differential amplifier. Owing to the fact that the main beam is positioned on the middle of the track and the auxiliary beams are positioned exactly between the tracks, the push-pull signal of the main beam detector is inverse with respect to that of the auxiliary beam detectors. Track error signals simulated, in particular, by actuator movements are eliminated owing to the fact that the push-pull signals of the auxiliary beam detectors are subtracted, in a manner added to and multiplied by a G factor, from the push-pull signal of the main beam detector. Owing to the numerous influencing factors, which have the effect that a track error signal is generated despite ideal track positioning and that the intensity distributions of the main and auxiliary beams can be different, it is necessary here, as well, for the G factor to be set or aligned individually manually and for each device. In order to set the optimum G factor, which is to be set independently of the loop gain of the track guidance control loop, use is made of a critical recording substrate or a recording substrate with disc runout or eccentricity in the form of a measuring disc which deflects the actuator and generates a corresponding push-pull track error signal. An oscilloscope is then used to observe the characteristic of the track error signal in the case of an open track control loop, and the G factor is optimally set. For this purpose, the setting of a G factor setter is varied until the track error signal represented on the oscilloscope occurs in a range which is optimum for control. As a result, control signals to be ascribed in essence to deviations of the scanning beam from the track are provided, and influences on the push-pull track error signal which are specific to the device and to the recording substrate are compensated. This is performed manually, purely by testing, and is therefore very time-consuming and must be carried out individually for each pickup or device on the basis of manufacturing tolerances. It is, furthermore, disadvantageous that the device parameters vary owing to ageing and external influences, with the result that an optimum G factor setting can be ensured only for a relatively short period. Moreover, no account is taken of influences on the track error signal which originate from different recording substrates. Independently of the G factor by means of which it is achieved that the control range of the track control loop can be fully utilized even when the actuator is deflected or other influences falsify the error signal, there is a need to compensate, an offset which may be present in the track control loop by means of a method described, for example, in EP 02 74 031 B1, for example, an offset which leads to asymmetry in the control range. However, the compensation of an offset voltage in the track control loop is referred only to a defined actuator position, with the result that despite offset compensation the control range is restricted or control stops in the case of non-optimum setting of the G factor and deflection of the actuator. There is therefore generally an additional requirement to set an optimum G factor or to align the G factor. By contrast with setting the control loop gain by means of which the proportional gain in the closed control loop is aligned, if necessary in an automated manner, compare EP 02 64 837 B1, the G factor setting is performed with an open control loop and is a precondition for the effectiveness of the control loop in the entire control range.

SUMMARY OF THE INVENTION

It is therefore the object of the invention to specify a method and an arrangement by means of which the outlay required for setting an optimum G factor is reduced and yet both influences specific to the device and influences specific to the recording substrate are taken into account in the optimum G factor setting.

This object is achieved by means of the features specified in claims 1 and 7. Advantageous developments are specified in the subclaims.

The principle of the invention consists in that deviations in the G factor setting from an optimum G factor setting are determined in an automated manner in conjunction with an open track control loop by driving the servo device to deflect the actuator from its track position and evaluating the push-pull signal, and the G factor is set in an automated manner to an optimum G factor. Two different approaches to a solution were found for this purpose, which consist in that in conjunction with an open track control loop the actuator is deflected by driving its servo unit and for the purpose of determining the deviation of a current G factor setting from an optimum G factor setting either a mean value of the push-pull signal is measured and the optimum G factor is set optimally by means of an iterative method in an automated manner, or a synchronous detector is used to form from the push-pull signal during the deflection of the actuator a signal which is suitable for automated setting of an optimum G factor. These methods can be applied both in conjunction with the known transverse push-pull and in conjunction with the known differential push-pull. The signal, formed using a synchronous detector from the push-pull signal during the deflection of the actuator, for automated setting of an optimum G factor is preferably an integration signal or a signal including both integral and proportional components. The advantages of using a signal including both integral and proportional components consist in that the risk of a connected integrator moving as far as into the boundary is reduced and operation is by means of a fixed residual error. Furthermore, the proportional component has an advantageous influence on the operating state in which no input signal is available.

The method based on averaging the track error signal and iteration is realized by means of a microprocessor, it being the case, advantageously, that it is possible to use a microprocessor which is generally present in such devices. This solution requires a low outlay on circuitry and owing to the implantation in the processor is highly flexible with respect to the use of different iteration principles.

The integrative method is determined by the use of a synchronous detector, the latter already directly detecting the direction of the deviation, with the result that the setting direction fundamentally does not vary.

The common aim of the methods consists in the push-pull track error signal being uniform over the entire range of the deflection of the actuator and not being influenced by other noise quantities, since this forms the basis of an optimum G factor setting. Only in the case of a uniform track error signal in the deflection range of the actuator, an offset correction already being assumed, can the full effectiveness of the track control loop be ensured. As already mentioned, in the case of the iterative method the mean value of the push-pull signal is measured during the deflection of the actuator, and the optimum G factor is set in an iterative method. For this purpose, it is preferred to connect a low-pass filter at an output providing the push-pull track error signal, in order to form the mean value, and the low-pass filter is connected via an analog-to-digital converter to a microprocessor for the purpose of evaluating the mean value of the push-pull signal in the case of deflection of the actuator. The track control loop is opened by means of the microprocessor, and a G-factor setter G is influenced stepwise and in terms of direction until upon deflection of the actuator the mean value of the track error signal exhibits no rise in the mathematical sense, that is to say neither an increase nor a decrease. A precondition for the alignment is the insertion in the device of a recording substrate which, by contrast with the known method, can be an arbitrary recording substrate. As a result, there is no longer a need to provide special measuring discs which represent a relatively high cost factor. The servo device is driven by the microprocessor in order to deflect the actuator. The method can be carried out using externally arranged means, it being the case, however, that because the recording substrate used also influences the G factor it is particularly advantageous to provide the means required for the automated G factor alignment in the device and to undertake in an automated manner optimum setting of the G factor with each renewed insertion of a recording substrate and/or also in pauses during the playback operation.

The integrative method can also be realized in an automated manner both using external means and, preferably, in the device without manual alignment. In order to realize the integrative method, a synchronous detector is connected via changeover switches to an output which provides the push-pull track error signal. The synchronous detector provides a signal, including integral or proportional and integral components, for influencing a G factor setter for optimum setting. In order to deflect the actuator, the servo device is separated from the track control amplifier and connected to an oscillator which provides an appropriate control signal for deflecting the actuator. Also connected to the oscillator is a trigger by means of which changeover switches at the input of the synchronous detector are controlled. The direction into which the G factor setter is to be influenced for optimum setting is determined directly thereby. The determination of the size or of the value of the optimum setting of the G factor is performed by integrating the remaining deviations from the optimum characteristic of the track error signal in conjunction with continuous approximation to the optimum G factor setting with the synchronous detector. The analog output signal of the synchronous detector is preferably digitized and fed to a sample-and-hold circuit, in order to ensure a high long-term stability of the determined value of the optimum G factor setting. After the alignment of the G factor, the track control loop is closed and the normal operation of the device is initiated. A microprocessor present in the device is preferably used to control this sequence.

Fundamentally, for the purpose of automated determination of deviations of the G factor setting from an optimum G factor setting the servo device is connected to a control device for deflecting the actuator from its track position, an evaluation unit which assesses the push-pull signal during the deflection is provided, and a setting device for automated setting of a G factor setter to an optimum G factor is connected to the evaluation unit. The control device for deflecting the actuator from its track position is preferably formed either by a microprocessor or by an oscillator, and the evaluation unit is preferably either a low-pass filter having a microprocessor, connected via an analog-to-digital converter, or a synchronous detector downstream of which a sample-and-hold circuit is connected, and the arrangement for automated determination and automated setting of an optimum G factor is preferably arranged in the device for playing back and/or recording information.

The solutions specified can be used to carry out the optimum setting of the G factor advantageously in an automated manner, with the result that there is no longer a need for manual setting. The automated G factor setting can, moreover, be carried out in the replay and/or recording device, as a result of which an appropriate account is taken in accordance with the current conditions of influences of the recording substrate on the G factor and of changes in the device parameters.

BRIEF DESCRIPTION OF THE DRAWINGS

The invention is explained in more detail below in exemplary embodiments with the aid of drawings, in which FIGS. 1(a–c) shows track error signal diagrams.

DETAILED DESCRIPTION OF THE DRAWINGS

Figure 1A:
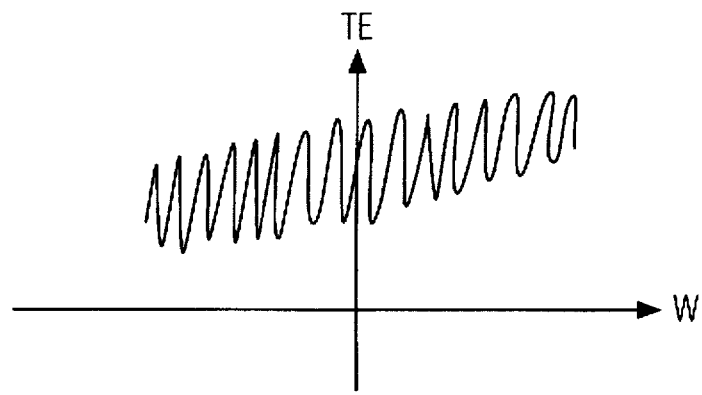
Figure 1B:
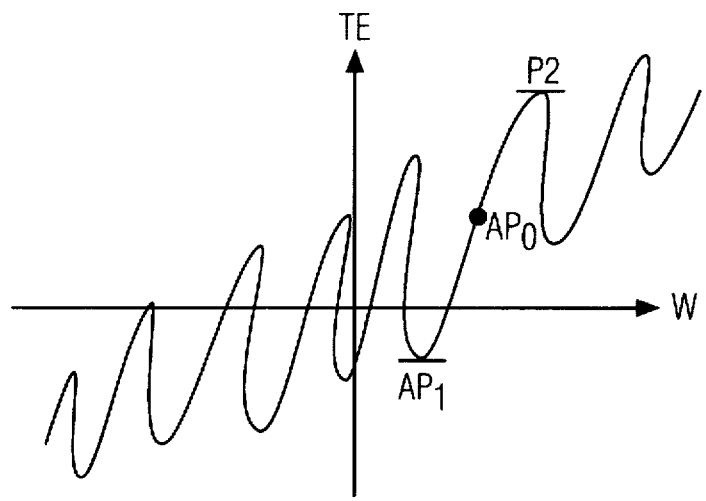
Figure 1C:
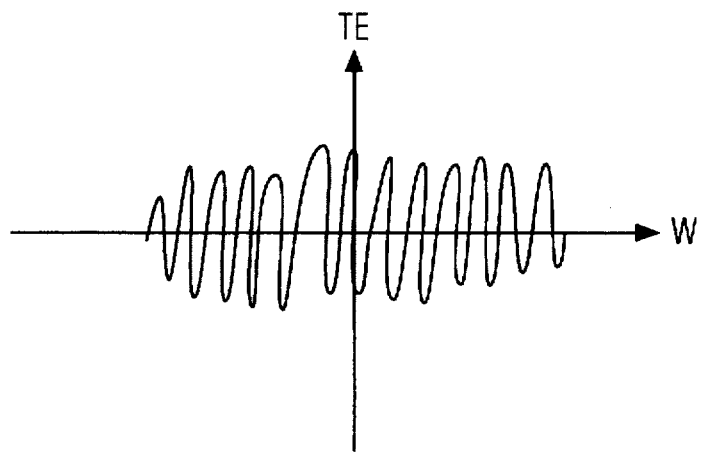

FIG. 1 specifies track error signal diagrams which represent different track error signals TE as a function of the path W of the deflection of the actuator. The track error signal TE represented in FIG. 1a characterizes both an offset in the control loop owing to the asymmetry relative to the W-axis of the diagram, and a G factor which is not optimally set owing to the rise or fall in the case of deflection of the actuator. The known correction of the offset leads to the track error signal diagram which is represented in FIG. 1b and which, despite the characteristic through the centre of the coordinate system, cannot yet be regarded as optimum since, in accordance with FIG. 1b, in the case of an unfavourable G factor and deflection of the actuator by a path W the track control is not effective to the full extent, or even ceases to function. Specified in FIG. 1b are an operating point AP0 in the middle range of the track error signal TE and, in accordance with this operating point AP0, limiting operating points AP1, AP2 at the minimum and maximum, respectively, of the track error signal range in the case of deflection of the actuator by a path W. It is to be seen that because of the rise in the track error signal TE upon deflection of the actuator the control range of the track error control is restricted at one end, and that upon overshooting a path W corresponding to the limiting operating point AP2 the control becomes ineffective. The G factor is generally to be set optimally, in order to ensure the effectiveness of the track control loop to the full extent even in the case of deflections of the actuator. Owing both to unavoidable eccentricities and to the subdivision of the radial drive into coarse drive and vernier drive, the deflection of the actuator occurs basically in the playback and/or recording modes of an optical recording substrate. The G factor is regarded as being optimally set when the track error signal TE has a characteristic, corresponding to FIG. 1c, which is symmetrical relative to the W-axis and has no rise. This applies both to a track control based on the transverse push-pull method and to one based on the differential push-pull method.

Figure 2:
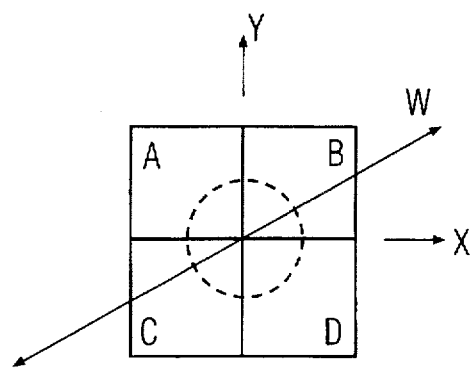
FIG. 2 shows a schematic sketch of a photodetector for transverse push-pull.

In the transverse push-pull or TPP, a photodetector comprising four quadrants A, B, C, D in accordance with the schematic sketch represented in FIG. 2 is arranged in such a way that the path W of the scanning beam does not extend parallel to a dividing line of the quadrants A, B, C, D of the photodetector.

Consequently, deflection of the actuator leads to variation in the detected light quantity in mutually perpendicular directions, and permits a correction factor, the so-called G factor, to be used to separate the track error signal TE which is to be ascribed exclusively to track deviations. It is possible using the coordinate system X, Y specified in FIG. 2 to set up the relationships X=(A+D)−(B+C) and Y=(A+B)−(D+C) and to specify TE=X−G*Y as track error signal. The G corresponds in this case to the correction value or the so-called G factor which is to be optimally set.

Figure 3:
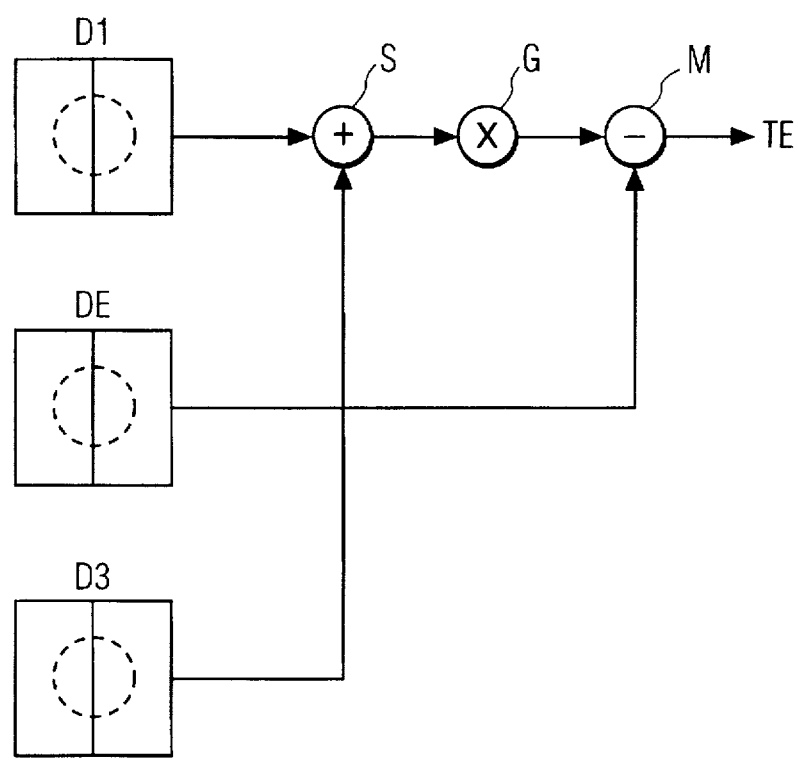
FIG. 3 shows a schematic sketch of a photodetector for differential push-pull.

In the differential push-pull or DPP, which operates with one main and two auxiliary scanning beams as well as three bipartite photodetectors D1, D2, D3, in order to generate a track error signal TE to be ascribed exclusively to track deviations in accordance with FIG. 3 the signals generated by means of photodetectors D1, D3 of the auxiliary beams are firstly added by means of a summer S and then corrected with a G factor, and the signal detected by the photodetector of the main scanning beam is then subtracted from the result by means of a subtractor M.

In order to be able to set the G factor optimally in an automated manner, two methods are proposed which can be applied in conjunction both with TPP and with DPP. Common to these methods is that deviations of the G factor setting from an optimum G factor setting in conjunction with an open track control loop are determined in an automated manner by driving the servo device to deflect the actuator from its track position and evaluating the push-pull signal and the G factor is set to an optimum G factor in an automated manner. For this purpose, either a mean value of a push-pull signal is measured during the deflection and the G factor is set in an iterative method by means of a microprocessor µP until the mean values correspond in the case of different deflections, or the actuator is deflected from its track position by means of a prescribed oscillator signal and the G factor is determined and set by means of a signal formed by a synchronous detector from a push-pull signal during the deflection. The foundation of the automated G factor setting is therefore formed by an iterative and/or a predominantly integrative method, it being preferable that proportional components should also be included in the integrative method. For the purpose of an optimum mode of operation of the track control loop, both methods for G factor setting assume that in addition to the G factor setting correction of the offset is provided in a known way in the controlled system. In order to permit an optimum G factor alignment independently of external influences and taking account of the influences originating from the recording substrate, the automated G factor alignment is preferably carried out in the device after the insertion of a recording substrate into the device for playing-back and/or recording information and/or during pauses in the playback of information.

Figure 4:
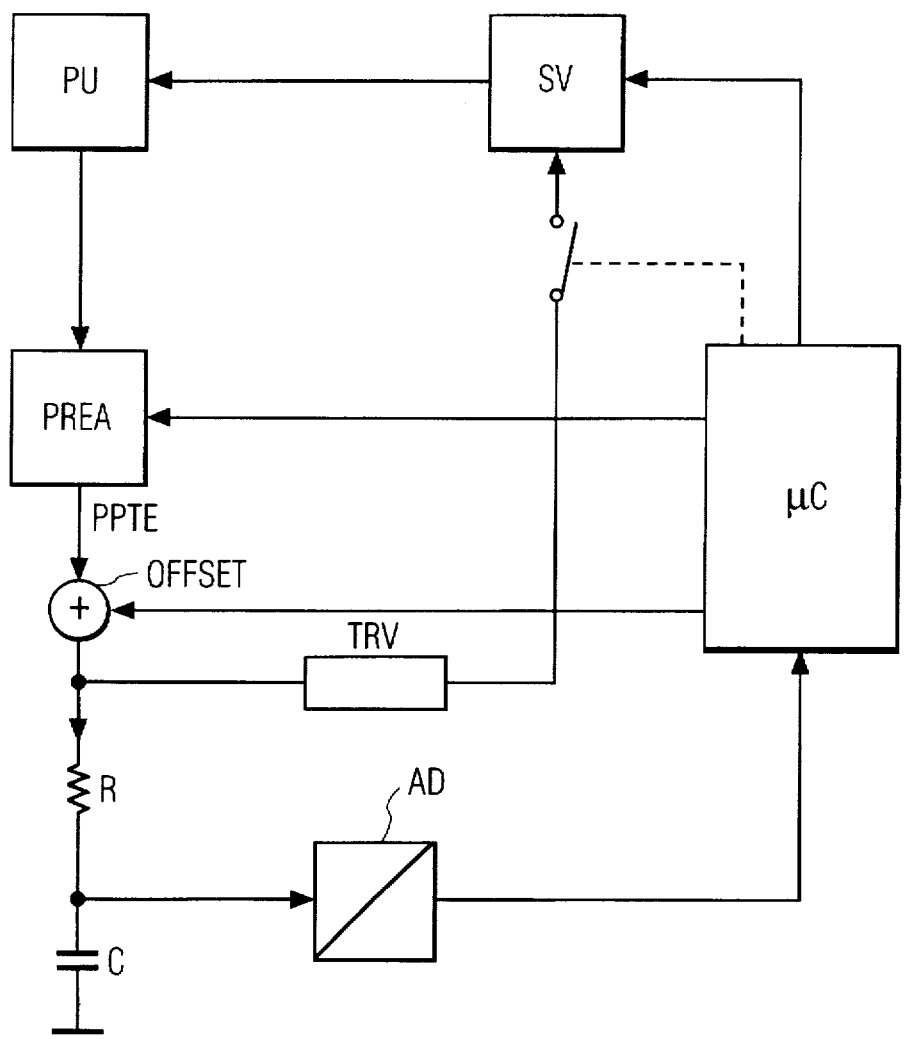
FIG. 4 shows a schematic sketch of a circuit arrangement for iterative G factor alignment.
Figure 6:
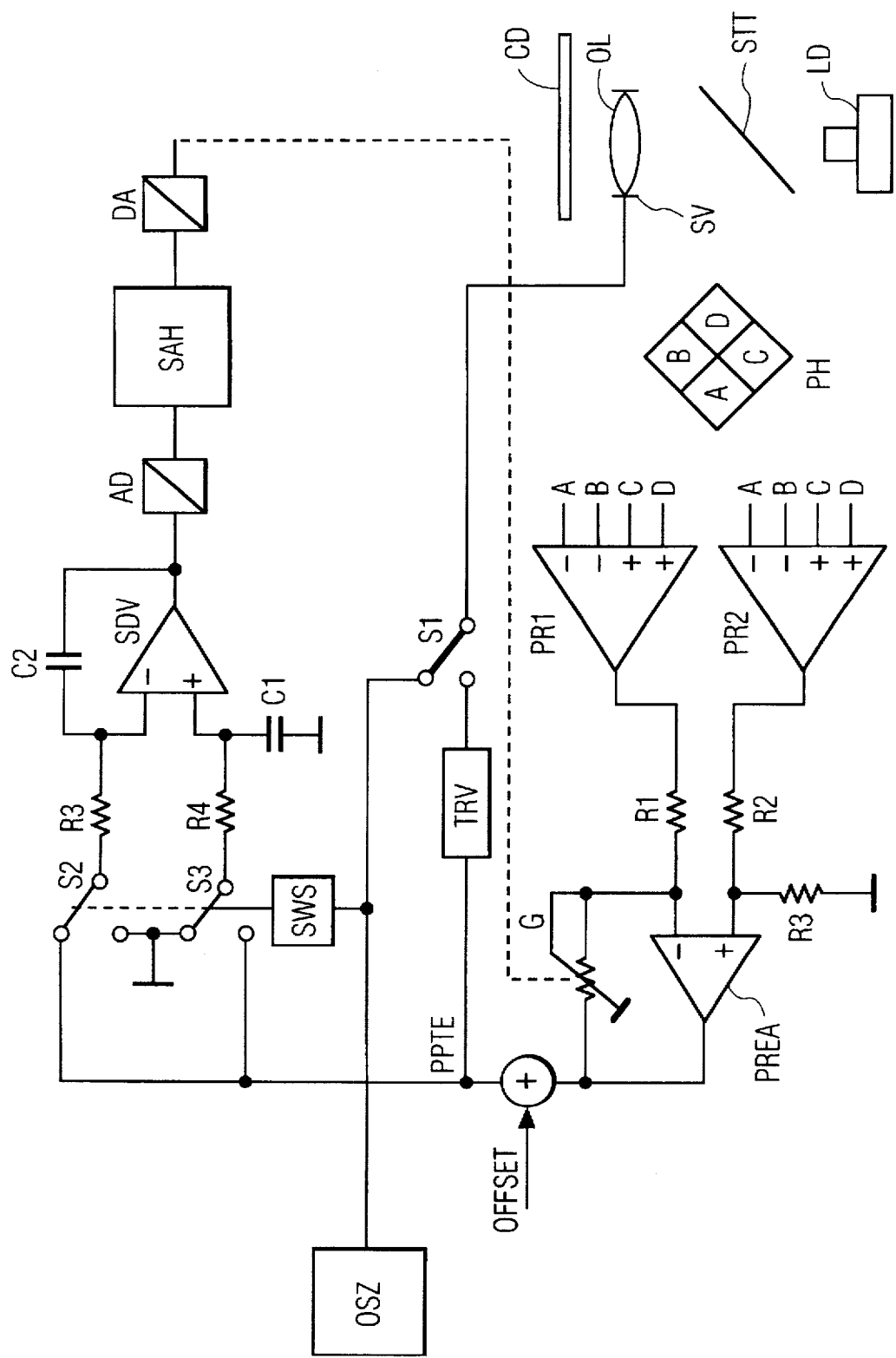
FIG. 6 shows a schematic sketch of a circuit arrangement for G factor alignment by means of a synchronous detector.

For the purpose of G factor setting in accordance with FIG. 4 and FIG. 6, the push-pull signal or track error signal detected during deflection of the actuator is fed to a G factor setter G which is preferably formed by an amplifier PREA which preferably has in at least one feedback branch for setting the G factor a resistor whose value can be varied electrically. A push-pull track error signal PPTE which in conjunction with an open track control loop forms the starting point of the methods for automated G factor setting is then available at the output of the G factor setter or of the amplifier PREA before or after an offset correction OFFSET.

In the iterative method, the push-pull track error signal PPTE is fed, in accordance with FIG. 4 and for the purpose of averaging, to a low-pass filter which is formed by a resistor R and a capacitor C. The low-pass-filtered push-pull track error signal PPTE is tapped at the connecting point between the resistor R and the capacitor C and fed to a microprocessor µP via an analog-to-digital converter AD. It is preferred to use as the microprocessor µP a microprocessor which is generally present in an optical playback and/or recording device. The first step for the G factor alignment is to open the track control loop of the device after the insertion of a recording substrate and/or also during a pause in playback by means of the microprocessor µP, and to deflect the actuator from its rest position or neutral position. In accordance with FIG. 4, for this purpose the connection between the track control amplifier TRV and the servo device SV of the device is broken, and a control signal for deflecting the actuator or pickup PU is fed to the servodevice SV from the microprocessor µP. The push-pull signal detected by means of the photodetector of the pickup PU is then fed, in a manner analogous to the normal operation of the device, to the amplifier PREA which contains (in a way not represented) a G factor setter. The push-pull track error signal PPTE corresponding to the deflection of the actuator by a path W is then in turn evaluated after averaging by means of the microprocessor µP. This evaluation by means of the microprocessor µP includes, in particular, an investigation of whether the characteristic of the track error signal TE has a rise or fall. If this applies, the current value of the G factor setting is varied by means of the microprocessor µP and the characteristic of the track error signal TE is once again analysed with regard to a deviation from an optimum setting of the G factor. This process is then repeated in an automated manner in an iterative method as far as the optimum setting of the G factor. Owing to the automation of the alignment, the alignment can be carried out in an advantageous way inside the device without the connection of external measuring devices and without manual outlay on alignment. After the optimum setting of the G factor, the connection between the track control amplifier TRV, to which an optimum track error signal TE is now fed for control, and the servo device SV is then reestablished by means of the microprocessor µP, and an optimum mode of operation of the device is ensured. As an additional feature by comparison with known circuit arrangements of comparable devices, the circuit arrangement, described with the aid of this function, for carrying out the method in accordance with FIG. 4 has essentially only one resistor R and one capacitor C for averaging the track control signal TE and push-pull track error signal PPTE by means of a low-pass filter, with the result that the outlay on realizing the method and the circuit arrangement is very low.

Figure 5:
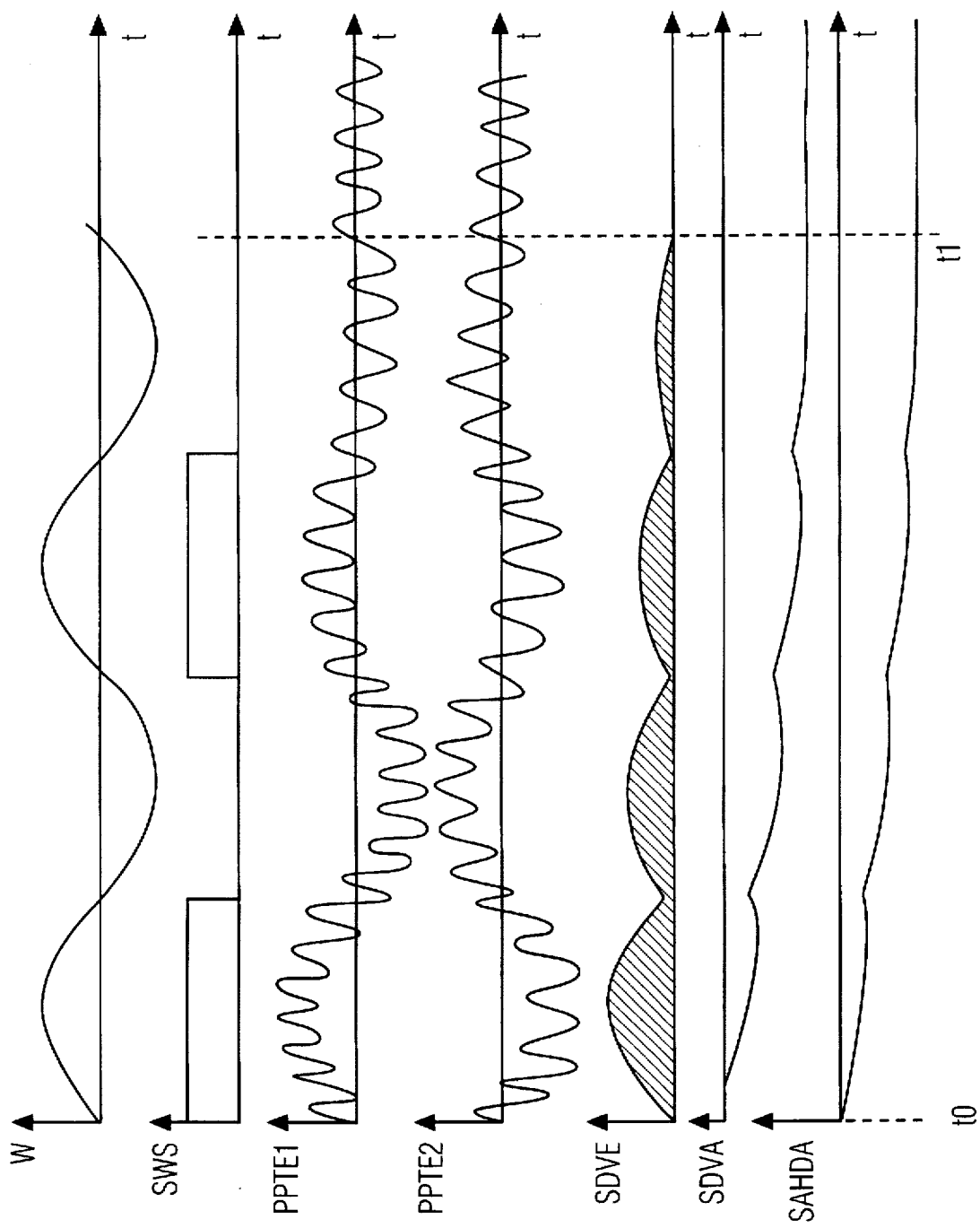
FIG. 5 shows signal characteristic diagrams for automated G factor setting by means of a synchronous detector.

The predominantly integrative method is explained with the aid of FIGS. 5 and 6. The block diagram given in FIG. 6 for carrying out the predominantly integrative method includes an information medium CD which is scanned by the scanning beam of a laser diode LD, the light of the laser diode LD passing a beam splitter STT and an objective lens OL for focusing the scanning beam on the information medium CD and for detection by means of a photodetector PH which includes four quadrants A, B, C, D. It is evident with the aid of the four-quadrant detector that this exemplary embodiment was designed for the transverse push-pull. It should therefore be pointed out once again that the application is possible in an equivalent way in conjunction with the differential push-pull. The light intensity signals detected by means of the quadrants A, B, C, D of the photodetector PH are fed, corresponding to the statements of the TPP, to a first and a second preamplifier PR1, PR2, whose outputs are connected via one resistor R1, R2 in each case to an input of an amplifier PREA. The non-inverting input of the amplifier PREA is led to earth via a third resistor R3, and the inverting input is connected to the output of the amplifier PREA via a resistor which can preferably be set by means of an electric signal. The amplifier PREA connected in this way forms the actual G factor setter G, and there is provided at its output an adder OFFSET for the known correction of an offset in the control loop, with the result that there is available downstream of the adder OFFSET a push-pull track error signal PPTE which is to be set optimally with regard to the G factor, in order to be able to be used as controlled variable for a connected track control amplifier TRV. As first step towards the G factor setting, the track control loop amplifier TRV is separated from the servo device SV, which is provided for deflecting the objective lens OL, by means of a switch S1, and the servo device SV is connected to an oscillator OSZ. The changeover signal is provided in this case by a microprocessor (not represented) present in the device, and the oscillator OSZ preferably provides a sinusoidal control signal for deflecting the actuator or the objective lens OL. The control signal deflects the actuator or the objective lens OL by a path W represented in FIG. 5 and, in accordance with FIG. 6, a trigger SWS by means of which a rectangular-pulse signal SWS represented in FIG. 5 is formed for the purpose of driving two changeover switches S2, S3 is connected at the oscillator OSZ. The push-pull track error signal PPTE or frame potential is alternately applied by means of the changeover switches S2, S3 at the inputs of a differential amplifier via a resistor R3 or a resistor R4, and the noninverting input of the differential amplifier is connected via a first capacitor C1 to a frame terminal, while its noninverting input is connected via a second capacitor C2 to the output of the differential amplifier. Together with the connected differential amplifier, the changeover switches S2, S3 form a so-called synchronous detector SDV by means of which the synchronous detector output signal SDVA, represented in FIG. 5, of a push-pull track error signal PPTE1 or PPTE2, is formed in accordance with the initial setting of the G factor setter G. Since in conjunction with the changeover owing to the signal of the oscillator OSZ which deflects via the path W the direction in which the G factor setter G is to be controlled for the purpose of optimum setting is determined at the input of the synchronous detector SDV, deviations of the push-pull track error signal PPTE1 or PPTE2 from an optimum characteristic can be used directly as setting criterion. The synchronous detector SDV is preferably a differential synchronous integrator or synchronous demodulator by means of which as a consequence of knowledge of the deflection direction of the objective lens OL there is advantageously a direct determination of the direction, that is to say decreasing or increasing, in which the G factor is to be influenced for optimum setting. No iteration is required. Since the frequency at which the objective lens OL is deflected is known on the basis of the driving by the oscillator OSZ, the direction in which the G factor setter G is to be controlled is determined directly, because it is to be assumed that the G factor or the amplification of the amplifier PREA is too large when the oscillator signal and the synchronous demodulator signal are in phase and, on the other hand, that the G factor or the gain of the amplifier PREA is too low when the oscillator signal and synchronous demodulator signal are in antiphase. The oscillator frequency is preferably a frequency below the mechanical self-resonance frequency of the actuator. In accordance with FIG. 5, a synchronous detector input signal SDVE corresponding to the deviation is active at the input of the synchronous detector SDV, and a sample-and-hold circuit SAH for driving the G factor setter G is connected, preferably via an analog-to-digital converter AD at the output of the synchronous detector SDV for the purpose of automated setting of the G factor. The sample-and-hold circuit SAH is used in a known way respectively to accept the current values for setting the G factor setter G and, finally, the optimum setting value is retained. This control and the changeover into closed-loop control are preferably carried out by means of the microprocessor already mentioned. In order to ensure a high long term stability of the setting value, determined in an automated manner, for the optimum G factor alignment, a digital sample-and-hold circuit SAH was preferably provided, although it would also be possible in principle to use a sample-and-hold circuit SAH operating in an analog manner. Furthermore, the exemplary embodiment has been described with the aid of a synchronous detector SDV which essentially provides integral signal components, although the use of a synchronous detector SDV which also provides proportional signal components is to be preferred, in particular in conjunction with the alignment response in the case of slight deviations from the optimum setting. The advantages of using a signal including both integral and proportional components consist in that the risk that a connected integrator moving as far as into the boundary is reduced, and operation is by means of a fixed residual error. Furthermore, the proportional component has an advantageous influence on the operating state in which no input signal is available.

The exemplary embodiment was selected, in particular, from the point of view of explaining the principle, as a result of which the scope of application is not restricted in conjunction with other synchronous detectors SDV.

We claim:

1. Method for setting a gain (a G factor) altering a slope of a track error signal, said track error signal being a composite signal comprised of,
   a first component dependent on position of an actuator relative to a track and
   a second component associated with said track error signal slope, said second component being dependent on deflection of said actuator from a neutral position and being correctable by means of said G factor, characterized in that
   deviations in G factor setting from an optimum G factor setting are reduced in an automated manner in conjunction with an open track control loop by
      driving a servo device to deflect said actuator away from said neutral position,
      (b) deriving a correction signal from a push-pull signal resulting from driving said servo device and
      (c) setting said G factor in an automated manner in response to said correction signal.

2. Method according to claim 1, further including the steps of
   measuring a mean value of said push-pull signal during deflection, and
   updating said G factor in an iterative manner to reduce said mean value.

3. Method according to claim 1, further including the steps of
   driving said servo device with a prescribed oscillator signal, and
   deriving said correction signal from a signal formed by a synchronous detector from said push-pull signal during deflection.

4. Method according to claim 3, wherein the signal formed by the synchronous detector is an integration signal.

5. Method according to claim 3, wherein the signal formed by the synchronous detector is
   a signal including both integral and proportional components.

6. Method according to claim 1, characterized in that
   said deviations are reduced in an automated manner after the insertion of a recording medium into a device for playing back or recording information.

7. Apparatus for setting a gain (a G factor) altering a slope of a track error signal, said track error signal being a composite signal comprised of,
   a first component dependent on position of an actuator relative to a track and
   a second component associated with said track error signal slope, said second component being dependent on deflection of said actuator from a neutral position and being correctable by means of said G factor, characterized in that
   deviations of G factor setting from an optimum G factor setting are automatically corrected by
      a servo device connected to a control device for deflecting said actuator away from said neutral position,
      an evaluation unit for processing a push-pull signal during deflection and producing a correction signal, and
      a setting device connected to said evaluation unit for automated setting of said G factor in response to said correction signal.

8. Apparatus according to claim 7, characterized in that
   said control device for deflecting said actuator from said neutral position is a microprocessor, and said control device is coupled to a low-pass filter and an analog-to-digital converter to form said evaluation unit, and said evaluation unit is connected to a preamplifier providing said push-pull signal for automated setting of said G factor by said setting device.

9. Apparatus according to claim 7, characterized in that
   said control device is an oscillator,
   said evaluation unit is a synchronous detector, and
   said setting device is a sample-and-hold circuit.

10. Apparatus according to claim 7, characterized in that said apparatus for automatically reducing deviations of G factor is included within a device for playing back or recording information.

* * * * *

UNITED STATES PATENT AND TRADEMARK OFFICE
CERTIFICATE OF CORRECTION

PATENT NO. : 5,764,605
DATED : June 9, 1998
INVENTOR(S) : Friedhelm Zucker, et al.

It is certified that error appears in the above-identified patent and that said Letters Patent is hereby corrected as shown below:

In the claims:

In claim 1, column 9, line 64, before the word "driving" insert: --(a)--.

Signed and Sealed this

Sixth Day of October, 1998

*Attest:*

BRUCE LEHMAN

*Attesting Officer*         *Commissioner of Patents and Trademarks*